A. L. HARVEY AND G. W. HUEY.
ELECTRICAL SYSTEM.
APPLICATION FILED MAR. 8, 1917.
1,381,302.
Patented June 14, 1921.
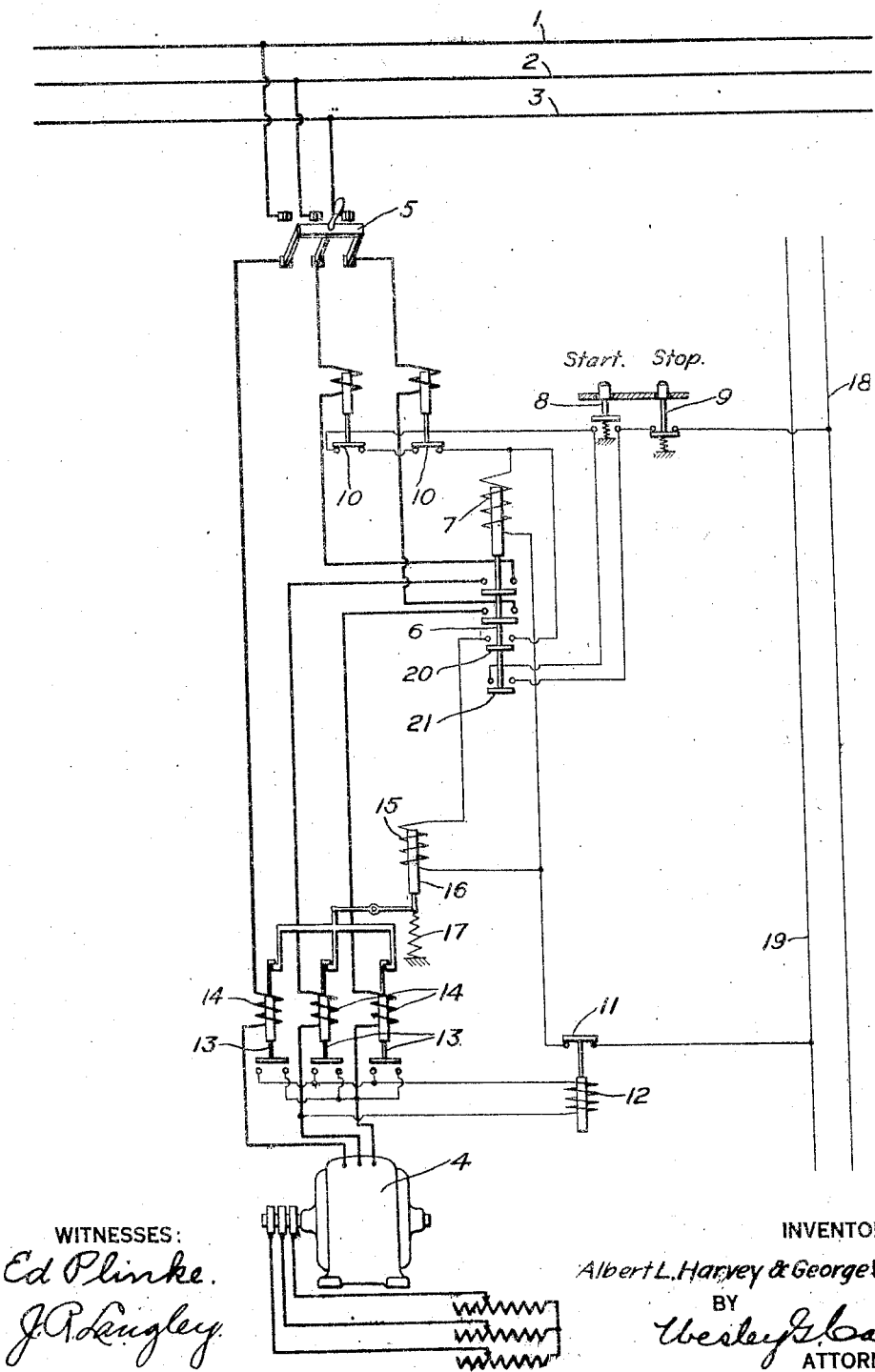

UNITED STATES PATENT OFFICE.

ALBERT L. HARVEY AND GEORGE W. HUEY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,381,302.          Specification of Letters Patent.     Patented June 14, 1921.

Application filed March 8, 1917. Serial No. 153,391.

*To all whom it may concern:*

Be it known that we, ALBERT L. HARVEY, a citizen of the United States, and a resident of Wilkinsburg, in the county of Allegheny and State of Pennsylvania, and GEORGE W. HUEY, a citizen of the United States, and a resident of Wilkinsburg, in the county of Allegheny and State of Pennsylvania, have invented a new and useful Improvement in Electrical Systems, of which the following is a specification.

Our invention relates to electrical systems, and it has for its object to provide an arrangement whereby the circuits of electric motors are controlled in accordance with conditions obtaining therein.

In the operation of electric motors, it may occur that one of the line conductors may be broken or that, for some other reason, there is a failure of voltage upon one or more conductors. Protective devices for alternating-current motors are usually provided with actuating coils which are connected between two of the line conductors of polyphase circuits. When such arrangements are employed, it is possible that, under certain conditions, any one of the line conductors may be broken without causing the protective device to open the motor circuit.

In the arrangement constructed in accordance with our invention, the connections between the source of energy and the motor are controlled by manually operable push-button switches and an electromagnetic line switch. The circuit of the actuating coil of the electromagnetic line switch is controlled by relays which correspond, in number, to the line conductors. The actuating coils of the relays are in series with the respective conductors of the circuit to be protected. Each of the relays is responsive, therefore, to current conditions obtaining in the corresponding line conductor and to failure of voltage in the corresponding phase. The line switch is opened automatically upon the failure of voltage in one or more of the line conductors.

In the accompanying drawing, the single figure is a diagrammatic view of circuits and apparatus embodying our invention.

Line conductors 1, 2 and 3, which may be connected to any suitable source of three-phase alternating-current electromotive force, supply energy to an alternating-current motor 4. The motor may be operatively connected to any suitable mechanical load. The motor circuits are controlled by a manually operable switch 5 and an electromagnetically operable line switch 6 having an actuating coil 7.

The circuit of the coil 7 is controlled by push-button switches 8 and 9 that are provided with appropriate legends for designating their functions. The circuit of the coil 7 is controlled, also, by overload relays 10 and by a relay 11 that is controlled in a manner to be described.

The relay 11 is provided with an actuating coil 12, the circuit of which is controlled by three underload relays 13 having actuating coils 14 that are in series with the respective phase windings of the motor. The coils 14 are arranged to maintain the corresponding relays in their upper positions for all values of currents obtaining during the operation of the motor from zero load to full load, under normal conditions. The relays are permitted to close, however, upon the occurrence of failure of voltage in the corresponding phases of the circuit since, in such case, the current traversing the phases thus affected falls to zero value. This arrangement is possible by reason of the fact that the current taken by an induction motor is relatively heavy at zero load.

Each of the relays 13 is mechanically connected to an electromagnet comprising a coil 15 and a core member 16. The relays 13 have a lost-motion connection to the core member 16 in order that the relays 13 may be retained in their upper positions by their respective actuating coils, in case the latter are energized above predetermined degrees. A spring 17 normally holds the core member 16 and the relays 13 in the respective positions in which they are illustrated. When the coil 15 is energized and the core member 16 is drawn upwardly, the relays 13 are permitted to fall to their closed positions if the coils 14 are energized below predetermined values.

To start the motor, the main switch 5 is closed and the push button switch 8 is actuated to its closed position and held there momentarily. A circuit is completed which extends from a conductor 18, which may be connected to any suitable source of either direct or alternating current, through push-button switches 9 and 8, overload relays 10, coil 7 and relay 11 to conductor 19.

The coil 7 is energized to close the line switch 6 and thus complete the primary circuits of the motor. The coils 14 are energized and tend to retain the relays in their respective upper positions. The closing of the line switch effects the closing, also, of switches 20 and 21 that are mechanically connected thereto.

The switch 20 completes a circuit for the coil 15, and the core member 16 is drawn upwardly against the force of the spring 17 to permit the relays 13 to fall to their lower positions in case the coils 14 are energized below the predetermined degrees for which they are arranged. The switch 21 completes a shunt circuit for the push-button switch 8, and the latter may be released at any time after the closing of the line switch 6.

If, for any reason, such, for example, as the failure of voltage of the source of energy in one of the phases or the breaking of one of the line conductors, either of the coils 14 is energized below the predetermined values, the corresponding relay may fall to its lower position to complete a circuit for the actuating coil 12 of the relay 11. The latter then opens to break the circuit of the coil 7 and the line switch 6 opens the motor circuit.

The opening of line switch 6 effects the opening, also, of switch 20, and the coil 15 is deënergized to permit the spring 17 to return the relays 13 to their respective upper positions. The coil 12 is deënergized and the relay 11 assumes its normal position. It is necessary to again actuate the push-button switch 8 to effect the starting of the motor.

The operation of the relays 13 to effect the opening of the motor circuit in the manner described above may occur either upon the initial closing of the line switch 6 or at any time thereafter during the operation of the motor in case of failure of voltage upon either of the line conductors.

By means of our improved arrangement, it is only necessary to close a manually operable switch and thereby effect the closing of the circuit of an electric motor. The circuit is immediately opened in case of abnormal voltage conditions or in case an excessive current traverses the motor circuit. In the latter case, the overload relays operate directly to open the circuit of the actuating coil of the line switch. The motor may be brought to rest at any desired time by actuating the "stop" push-button switch. The "start" push-button switch is ineffective to start the motor while abnormal conditions continue, since the circuit controlled by it is opened by one or more of the protective relays upon the closing of the line switch. The above and other advantages will be apparent to those skilled in the art to which our invention appertains.

We claim as our invention:

1. In an electrical system, the combination with an electric circuit, of a controlling switch therefor, a relay having an actuating coil in said circuit and adapted to close to cause said switch to open under predetermined conditions, and means independent of said circuit for maintaining said relay open when said controlling switch is open.

2. In an electrical system, the combination with an electric circuit, of a controlling switch therefor, an actuating coil for closing said switch, a relay adapted to close under predetermined circuit conditions to cause the deënergization of said coil and the consequent opening of said switch, and means controlled by said switch for actuating said relay to an inoperative position upon the opening of said switch.

3. In an electrical system, the combination with an electric circuit, of a controlling switch therefor, a relay for causing said switch to open under predetermined conditions, means for maintaining said relay open when said circuit is deënergized and means for releasing said maintaining means when said circuit is energized.

4. In an electrical system, the combination with an alternating-current circuit and an electromagnetically operable switch for controlling said circuit, of a circuit independent of said alternating-current circuit and comprising a coil for said switch, a normally closed relay for controlling said switch, a plurality of relays that are respectively responsive to circuit conditions obtaining in the several conductors of said circuit for controlling said normally closed relay, and means controlled by said switch for actuating said relays to inoperative positions.

5. In an electrical system, the combination with an electric circuit, of a controlling switch therefor, a relay for causing said switch to open under predetermined conditions, means for normally maintaining said relay open, means for releasing said maintaining means and means connected to said switch for rendering said maintaining means again operative.

6. In an electrical system, the combination with an alternating-current circuit comprising an electric motor and a switch, of means for controlling said switch in accordance with the respective values of the currents traversing said circuit, said means comprising a plurality of relays having coils respectively in circuit with the phase windings of said motor and means for maintaining said relays in inoperative position when said switch is open.

7. In an electrical system, the combination with an alternating-current circuit comprising an electric motor and a switch, of means for controlling said switch in accordance with the respective values of the currents traversing said circuit, said means comprising a plurality of relays having coils respectively in circuit with the phase windings of said motor and mechanical means for rendering said relays inoperative when said switch is in its open position.

8. In an electrical system, the combination with an alternating-current circuit comprising an electric motor and a switch, of means for controlling said switch in accordance with the respective values of the currents traversing said circuit, said means comprising a plurality of relays having coils respectively in circuit with the phase windings of said motor, an electromagnet having a lost-motion connection to said relays for rendering them inoperative when the motor circuit is open and for permitting them to operate under predetermined conditions when the motor circuit is closed.

9. In an electrical system, the combination with an alternating-current circuit comprising an electric motor and a switch, of means for controlling said switch in accordance with the respective values of the currents traversing said circuit, said means comprising a plurality of relays having coils respectively in circuit with the phase windings of said motor, a circuit independent of the motor circuits and comprising an actuating coil for said switch, a switch for controlling the circuit of said coil, and means for opening the circuit of said actuating coil upon the closing of any of said relays, independently of the position of said controlling switch.

10. In an electrical system, the combination with an electric motor and an electromagnetic switch for controlling the circuits of said motor, of an electric circuit independent of the motor circuits and comprising an actuating coil for said switch, a manually operable switch for controlling the circuit of said coil, and means operable independently of the position of said manually operable switch for opening the circuit of said coil upon the occurrence of abnormal conditions in said motor circuits.

11. In a motor-control system, the combination with an electric motor and a switch-device for controlling the circuits of said motor, of a manually operable switch for initiating the operation of said switching device, and means comprising a plurality of relays controlled by circuit conditions for effecting the operation of said switching device to open the motor circuits independently of the position of said manually operable switch.

12. In an electrical system, the combination with an electric circuit, of a controlling switch therefor, an actuating coil for closing said switch, a normally closed relay for controlling the circuit of said coil and a second relay for opening said normally closed relay under predetermined conditions to cause the deënergization of said coil and the consequent opening of said switch.

13. In an electrical system, the combination with an electric motor and a controlling switch therefor, of an actuating coil for said switch, a manually operable switch for energizing said coil, a switch for maintaining said coil energized, means for deënergizing said coil under predetermined conditions and means for thereupon rendering said maintaining switch inoperative.

In testimony whereof, we have hereunto subscribed our names this 27th day of Feb., 1917.

ALBERT L. HARVEY.
GEORGE W. HUEY.